C. R. DAVIS.
FERTILIZER DISTRIBUTER.
APPLICATION FILED APR. 11, 1916.
1,327,654.
Patented Jan. 13, 1920.
2 SHEETS—SHEET 1.
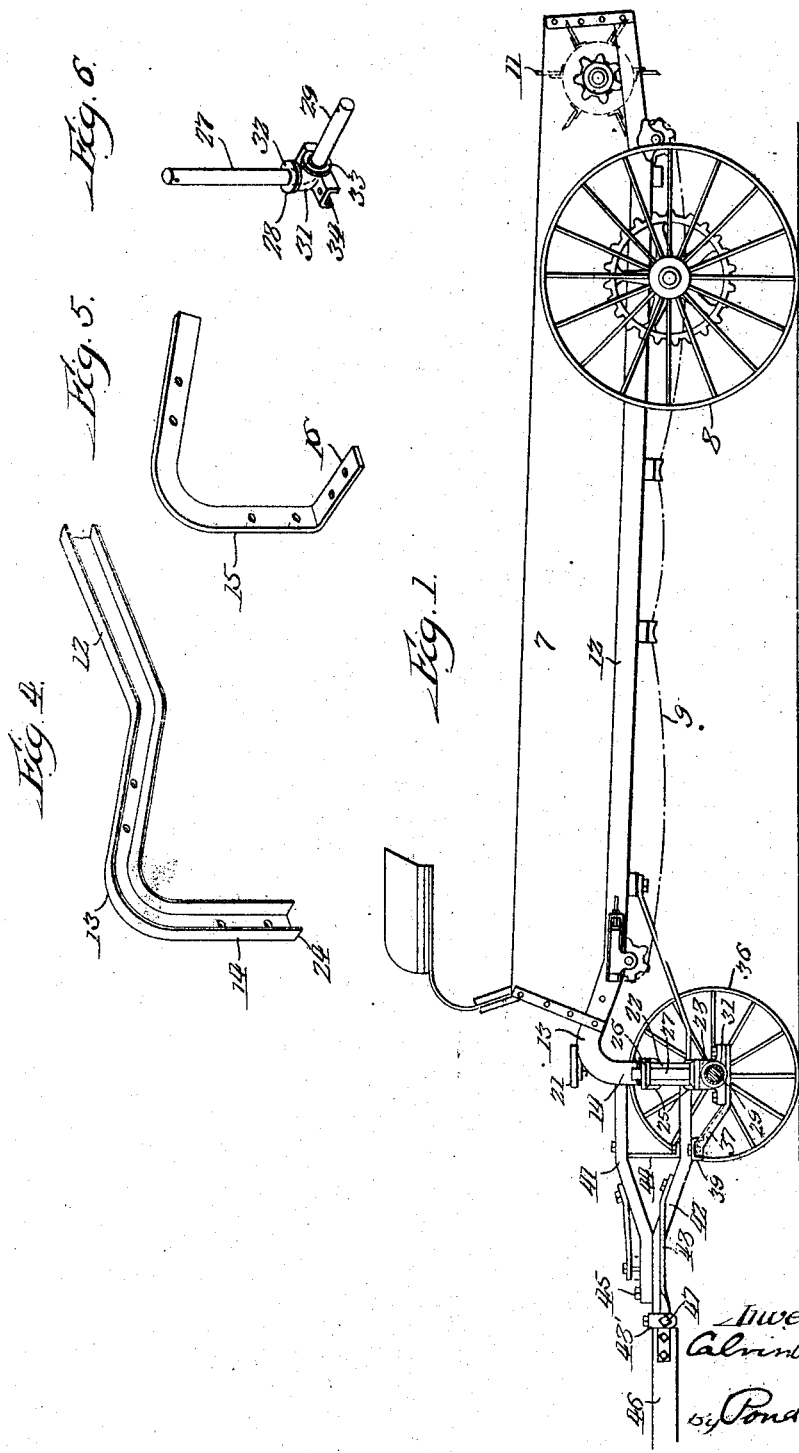

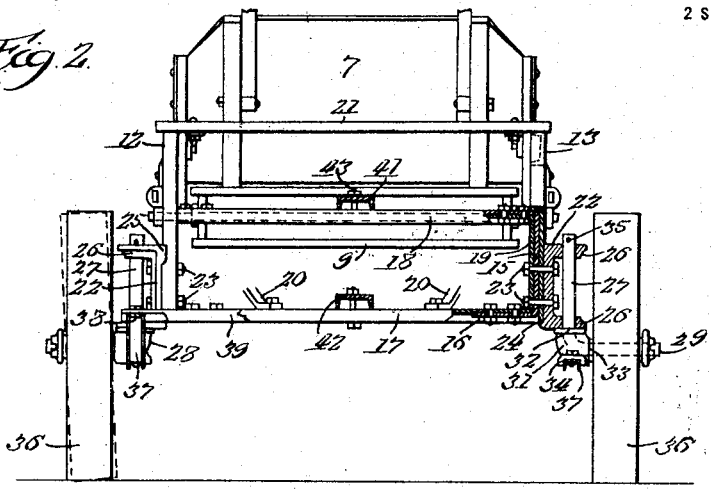
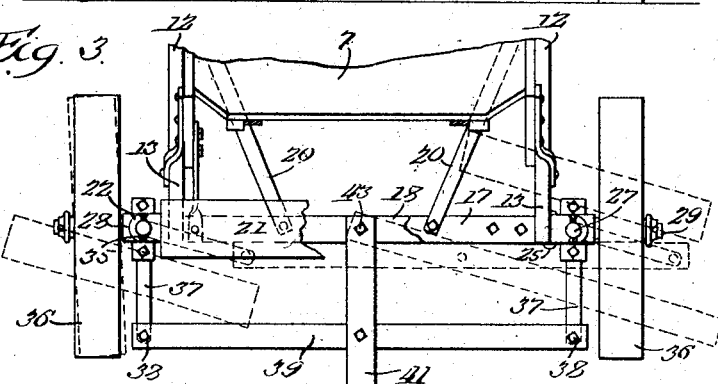
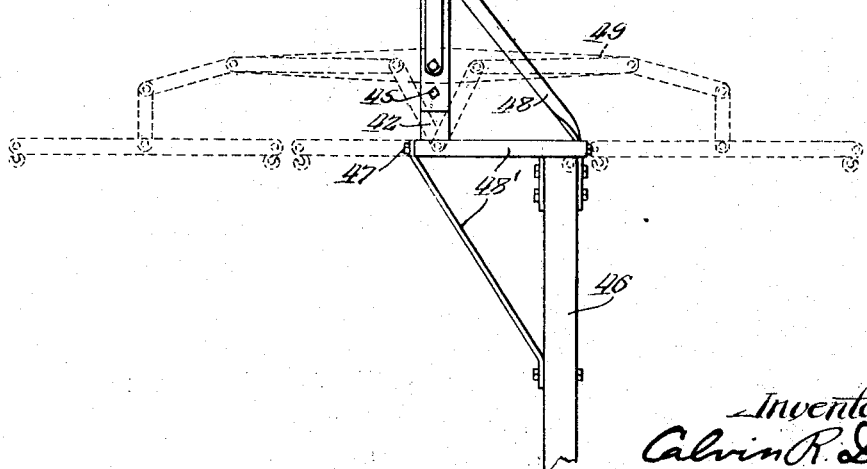

UNITED STATES PATENT OFFICE.

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

FERTILIZER-DISTRIBUTER.

1,327,654.　　　　　Specification of Letters Patent.　　Patented Jan. 13, 1920.

Application filed April 11, 1916. Serial No. 90,482.

*To all whom it may concern:*

Be it known that I, CALVIN R. DAVIS, a citizen of the United States, residing at Rockford, in the county of Winnebago and State of Illinois, have invented certain new and useful Improvements in Fertilizer-Distributers, of which the following is a specification.

This invention relates in general to fertilizer distributers or spreaders, and has more particular reference to the front frame and supporting wheel structure and to the draft means connected therewith.

In the construction of fertilizer distributers, it is desirable for reasons well known in the art to mount the fertilizer box as low as possible, and in so doing, various difficulties have been encountered with respect to the front wheel and axle structure and the draft means. The employment of the ordinary pivoted fore-axle that turns on a fifth wheel is unsatisfactory, since, due to the rough ground conditions often met with, the draft pole connected to the axle is thrown back and forth between the horses at every oscillation of the axle on the king bolt caused by the wheels passing over uneven ground and obstructions. Also because of the heavy load that must be carried, it is difficult to turn the axle, as in the case of turning out of a rut or even during ordinary turning; furthermore, the hitch or draft means can not be attached as close to the load as is desired.

My invention is designed, primarily, to obviate these objectionable features by the provision of improvements that minimize the strain on the horses, secure lightness of draft, and generally improve the front frame and wheel structures.

Another object of my invention is in the provision of a rigid fore-axle structure to the sides of which are pivoted front supporting wheels that turn on upright axes and are connected with a pole or draft device so as to be angled in unison when the draft device is swung laterally with respect to the frame. By mounting the front wheels in this manner they will not be subjected to continuous oscillation when traveling over rough ground, and consequently the pole will not jerk back and forth but will ride quietly between the horses. Furthermore, very little force is required to angle the wheels through the pole because of the advantages in leverage gained by this arrangement.

In further respect to the mounting of the front wheels, I have provided an exceedingly simple yet rigid and durable construction characterized by the provision of side sills arched at their forward ends and terminating in upright supports on which steering knuckles are mounted, the arrangement being such that the wheels may swing beneath the sills and still allow the fertilizer box to be mounted low.

Other novel features embodied in the design of the front frame, dirigible wheel and draft structures with the view to durability and cheapness of construction will be apparent as the invention becomes better understood by reference to the following specification when considered in connection with the accompanying drawings, in which—

Figure 1 is a side elevation of a manure spreader embodying my improvements;

Fig. 2 is a front elevation of the spreader, portions being broken away in vertical section;

Fig. 3 is a fragmentary plan view of the fore end of the spreader; and

Figs. 4, 5 and 6 are detail views in perspective of the fore end of one of the side sills, a reinforcing brace therefor, and a steering knuckle, respectively.

In the drawings I have illustrated generally a conventional type of fertilizer distributer and in detail the fore end structure thereof to which my invention has specific reference, and it should be understood that my improvements are in no way limited to the fertilizer feed and distributing mechanisms disclosed herein. The fertilizer distributer shown consists of the fertilizer box generally designated by the reference character 7 supported by rear drive wheels 8, an endless fertilizer feed conveyer or apron 9 and a beater 11, the mechanisms for driving the apron and beater from the drive wheels not being shown.

In carrying my improvements into effect, I preferably construct the main frame of the spreader so as to include channel side sills designated in general by reference character 12 which extend longitudinally the entire length of the spreader as shown in Fig. 1. This gives a substantial frame foundation and yet allows without injury a certain amount of torsional variations or flexing of the frame when the distributer, heavily loaded, is drawn over uneven ground. In order that the fertilizer box may be set relatively low and to utilize my improved dirigible wheel and draft features to the best advantage, the fore ends of the sills are inclined upwardly or arched as at 13, above the plane of the sills and then directed downwardly so as to terminate in upright supporting portions or feet 14. These fore ends of the side sills are strengthened by reinforcing elements in the form of flat bars 15 shaped to fit within the channel walls of the sills throughout the arched and upright portions thereof and are turned inwardly at their lower ends providing horizontal ledges 16. The reinforcing elements may be suitably bolted or otherwise secured to the side sills. To the inturned ledges 16 is bolted a cross channel bar 17, constituting with an upper cross channel bar 18 that is bolted at its ends to an angle plate 19 in turn secured to the upright sill portions at the inner side of the reinforcing elements, a rigid fore-axle structure. The axle structure is further braced by longitudinally extending trusses 20 secured at their rear ends to the fertilizer box. A foot board 21 suitably mounted joins the arched portions and the side sills.

From the foregoing, it will be evident that I have provided a frame structure unique in the fact that the side sills of the frame are arched upwardly at their forward ends and are turned downwardly so as to terminate in upright portions upon which the dirigible front supporting wheels are mounted as will be apparent hereinafter. These arched portions, integral with the sills, afford a very rigid and substantial means for establishing a connection between the front wheels and frame and also allow, as will presently be seen, the pivot wheels to turn under the arched portion of the sills so that a low-down vehicle structure may be obtained. The fore-end frame structure is further rendered very rigid and substantial by the employment of lower and upper cross bars 17 and 18 respectively, which bind the arched sill portions together and thus provide a strong, durable and braced structure with which draw bars coöperate in a very effective manner as will be noted hereinafter.

Coming now to the dirigible wheel structure, a yoked bracket designated generally by 22 is secured by bolts 23 to the outer side of each upright foot or supporting portion 14 of the side sills, the bolts 23 extending also through the reinforcing elements 15 and the angle bars 19 so as to bind these elements rigidly together. It will be noted, viewing Fig. 2, that the lower ends 24 of the sill portions 14 are stepped on the brackets 22 and that the latter are provided with side lugs 25 embracing fore and aft sides of the sill portions 14, so that the bolts 23 are not subjected to shearing strains. The arms of the yoked bracket 22 provide vertically alined bearings 26 in which are journaled pivoted arms 27 of steering knuckles designated generally by 28. The steering knuckles are each formed preferably of solid cylindrical L-shaped bars providing pivots 27 and wheel spindles 29, about the elbows of which knuckles are cast bodies 31 shaped to provide abutments or collars 32 and 33 at the lower and inner ends of the pivots 27 and spindles 29 respectively, and also to provide channel recesses 34 extending transversely to the spindles. The lower bearing arms 26 rest on the abutments 32, and cotter pins 35 or any suitable means may be provided for preventing lengthwise displacement of the pivots 27 from their bearings. Front supporting wheels 36 are journaled on the spindles 29. The steering knuckle and its mounting, of simple construction, has been designed with a view to durability and cheapness in the cost of production. In this connection it should be remembered that the ordinary load carried by a manure spreader of this type averages about two tons; consequently, the wheel mounting just described must be very substantial and not liable to become loosened or in any way displaced during ordinary usage.

Channel steering arms 37 disposed in the recesses 34 and bolted to the knuckles 28 extend forwardly and upwardly and are pivotally connected at 38 to a distance rod 39, also in the form of a channel bar. The distance rod 39 maintains the dirigible wheels in parallelism and upon shifting the said rod laterally of the machine the wheels will be angled in unison on their pivots. The wheels may be angled to a position substantially at right angles to the spreader as shown in dotted lines in Fig. 3, to enable the spreader to be turned in a short radius, and in this connection it will be noted that in turning in either direction one of the wheels will be swung beneath the arched portion 13 of the adjacent side sill. Thus with this type of front wheel mounting, I am enabled to position the wheels relatively close to the load and to obtain a comparatively low mounting of the fertilizer box.

The draft means consists of a draw bar structure comprising upper and lower draw bars 41 and 42, in the present instance in the form of channel bars respectively pivotally connected in vertical alinement at 43 to the upper and lower cross-bars 18 and 17. These draw bars braced by an interposed bar 44 at which point the lower draw bar 42 is pivotally connected to the distance rod 39, are converged forwardly and fixedly secured together at 45, the lower draw bar 42 extending in advance of the upper. Pole and draft means are applied to the draw bars in a manner which will prevent the vibratory movements of the draw bars incidental to drawing the vehicle over uneven ground from being imparted to the tongue and consequently interfering with the horses. In other words, I have provided a draft means which will relieve the horses of any undue strains and will greatly lessen the draft as felt by the horses. For this purpose, I have provided a pole or tongue 46 pivotally connected to the draw bar structure on a horizontal axis and have attached the draft means such as a three-horse evener 49, directly to the draw bar structure. In the present instance I have provided an offset pole structure to enable the use of a three-horse hitch and for purpose of illustration I have shown the pole 46 pivotally connected in offset relation to the draw bar structure through the intermediary of a pivot bolt 47 and lateral brace rods 48 and 48'. By reason of this construction the pivot bolt 47 may be removed, the pole 46 together with the brace rods 48' inverted so as to position the pole in longitudinal alinement with the draw bar structure and the pivot bolt 47 replaced to pivotally connect the pole to the draw bar structure. It will be manifest from the foregoing that only the weight of the pole 46 is carried by the horses as the draft means 49 is attached directly to the draw bar structure and that the vibratory movement of the latter, due to its direct connection with the frame structure, is not felt by the horses because of the arrangement of the pole and draft means. Lightness of draft is also secured, due to the closeness of the hitch to the fertilizer box, and also the draft is so applied or distributed that a substantially straight line draft to the spreader frame is secured, which does not cause excessive strain on the forearm structure. It will be further noted, due to the proximity of the dirigible wheels to their pivots and the lever arrangement between the wheels and draft pole, that the wheels in passing over obstructions will not be easily shifted or oscillated, and subsequently, the pole will not be swung back and forth between the horses as is the case when the ordinary axle that turns on the fifth wheel is employed. Furthermore, a material advantage in leverage is gained so that the tongue may be easily swung laterally to turn the wheels against a considerable resistance as when turning out of a rut or to pass some obstruction. By reason of these advantages, the horses are relieved of much strain and annoyance that is caused with the ordinary pivoted type of axle.

I claim:

1. In a vehicle, the combination of channel shaped side sills, the front ends of which are arched upwardly and terminate in upright portions that extend below the plane of the sills, a reinforcing element for each sill shaped to fit within the channel walls thereof extending through the arched portion to the lower end of said upright portion and thence turned inwardly, a cross-bar secured to the inturned ends of said reinforcing elements, and a dirigible supporting wheel pivotally mounted on an upright axis on each of said upright sill portions.

2. In a vehicle of the character described, the combination of a body frame having longitudinal side sills extending upwardly at their forward ends above the horizontal plane of the sills and then directed downwardly so as to terminate below said plane, front supporting wheels dirigibly mounted on said downwardly directed sill portions, means interposed between and rigidly securing said downwardly directed sill portions together, and a draw bar structure pivotally mounted on said interposed means and connected with the dirigible wheels for steering them.

3. In a vehicle, a body frame having longitudinal side sills arched at their forward ends and terminating in downwardly extending supporting portions, dirigible wheels mounted on said supporting portions, upper and lower cross bars connecting said supporting portions of the sills, and a draw bar structure pivotally connected to the upper and lower cross bars and also connected with the dirigible wheels for angling the same in unison.

4. In a low-down spreader, a frame having longitudinal side sills shaped at their forward ends to provide integral vertically disposed wheel supporting portions, dirigible wheels mounted on said wheel supporting portions, upper and lower cross bars interposed between and rigidly secured to said wheel supporting portions, and a draft bar structure pivotally mounted medially upon said upper and lower cross bars and connected with the dirigible wheels for angling the same in unison.

5. In a vehicle, the combination of a frame having longitudinal channel shaped sills, the front ends of which are turned downwardly providing wheel supporting portions, a reinforcing element secured to each sill extending between its channel walls and extending through its bent portion to its upright supporting portion and being thence turned inwardly of the frame, and a cross bar mounted upon and fixedly secured to said inwardly turned portions of the reinforcing elements.

6. In a vehicle, the combination of a frame having longitudinal side channel sills shaped at their forward ends to provide upright wheel supports, means secured to the sills between the channel walls of their upright wheel supporting portions and providing inwardly extending upper and lower ledges, upper and lower cross bars respectively secured to the upper and lower ledges, and a draw bar structure pivotally mounted on said upper and lower cross bars.

7. A vehicle frame having a rigid front axle structure including upper and lower cross bars, upright wheel supports fixed to the ends of the cross bars and extending rearwardly therefrom and fixed also to the frame proper, whereby the wheel supports are positioned forwardly of the frame, a supporting wheel dirigibly mounted on each upright support and adapted to turn beneath the rearward extensions thereof, and draft means pivotally connected to the upper and lower cross bars and to the wheels for steering the same.

8. The combination of a vehicle frame having side channel sills extending substantially co-extensive of the length of the vehicle body and extending forward beyond the front end of the body and turned downwardly providing vertically disposed portions in the vertical planes of the respective sills, a rigid cross structure interposed between and attached to said vertical sill portions holding them in rigid spaced relation, a stub axle spindle in proximity to the outer side of each vertical sill portion, wheels for the axles, means attaching each spindle to its respective sill portion so that the wheels may turn about their respective spindles, a tongue element pivotally mounted on said cross structure, and connection between said tongue element and the stub axles for angling the wheels in unison.

9. The combination of a vehicle frame having side sills extending substantially co-extensive of the length of the body and arched beyond the forward end of the body and turned downwardly providing vertical sill portions, front wheels, stub axles therefor, each having a vertical spindle in proximity to and in vertical alinement with one of the vertical sill portions, a bracket interposed between each vertical sill portion and the adjacent spindle and having upper and lower bearings in which such spindle is mounted, means rigidly securing the brackets to said sill portions, a rigid structure interposed between and rigidly securing said upright sill portions in spaced relation, and means for angling the wheels in unison.

10. The combination of a vehicle frame having side sills extending substantially co-extensive of the length of the vehicle body and having their forward ends arched and turned downwardly beyond the forward end of the body, cross bars interposed between and securing the vertical forward portions of the sills in rigid spaced relation, a wheel spindle arranged in close proximity to and in vertical alinement with each of said vertical sill portions, means pivotally attaching each spindle to its respective sill portion, a wheel for each spindle, and steering means connected with the wheels and one of said cross bars for angling the wheels in unison about their respective spindles.

CALVIN R. DAVIS.